United States Patent

Dahle

[15] 3,648,524
[45] Mar. 14, 1972

[54] PRESSURE INDICATOR, ESPECIALLY FOR MEASURING PRESSURE IN DIESEL ENGINES

[72] Inventor: Orvar Dahle, Vasteras, Sweden

[73] Assignee: Allmanna Svenska Elektriska Aktiebolaget, Vasteras, Sweden

[22] Filed: Oct. 22, 1970

[21] Appl. No.: 82,954

[30] Foreign Application Priority Data

Oct. 29, 1969 Sweden..................14762/69

[52] U.S. Cl. ..............................73/398 R, 73/115, 73/393, 73/406
[51] Int. Cl. ........................................G01l 9/10
[58] Field of Search..................73/393, 398 R, 406, 115

[56] References Cited

UNITED STATES PATENTS 2,539,833   1/1951   Hathaway..............................73/398

Primary Examiner—Donald O. Woodiel
Attorney—Jennings Bailey, Jr.

[57] ABSTRACT

A sealing cone adapted to be secured on an indicating tap of a diesel engine has a central passage communicating with a diaphragm mounted in a housing. Another housing includes a force-measuring device such as a transducer. Pressure forces are transmitted from the diaphragm to the transducer by a central cylinder, and counter-acting tensile forces by a ring surrounding the cylinder and connected by sets of low-heat-conducting screws to both housings, the screws of the two sets being symmetrically spaced from each other around the ring. The cylinder and ring are formed of rigid thermally insulating material. The transducer is thus protected from the heat of the diesel engine.

7 Claims, 15 Drawing Figures

Patented March 14, 1972

INVENTOR.
OIVAR DAHLE
BY
*[signature]*

Patented March 14, 1972 3,648,524

INVENTOR.
ORTAL DAHLE
BY
Jennings Bailey, Jr.

PRESSURE INDICATOR, ESPECIALLY FOR MEASURING PRESSURE IN DIESEL ENGINES

BACKGROUND OF THE INVENTION

1. Field of the Invention

The invention relates to an indicator for pressure in a space, especially in the cylinders of diesel engines.

2. The Prior Art

With diesel engines, particularly for ships, there is a great need for continuous supervision of the pressure or pressure variations in the various cylinders. Previous attempts at this measurement have been unsuccessful mainly because the pressure conduit to the force-sensitive member becomes quickly blocked by dirt and carbonization. In order to prevent the force-sensing member from becoming too hot the pressure conduit has been water-cooled, but this has cause over-distillation of the water, sulphuric acid and tar from the cylinder. Pressure conduits, either empty or filled with water or fat, have become blocked up after a week and the indicator connected to the coolant pipes has had to be dismantled.

SUMMARY OF THE INVENTION

According to the invention these disadvantages have been eliminated by permitting the diaphragm part to operate at high temperature without cooling and connect it to the measuring part by a heat-resistant and thermally insulating rigid connecting joint therebetween having a central force-transmitting part and a part transmitting tensile force and combining these into a unit. By also providing the housing containing the force-sensing member with outer cooling flanges it is ensured that the force-sensing member, the transducer, has a reasonable operating temperature. According to the invention, a sealing cone adapted to be secured on an indicating tap of a diesel engine has a central passage communicating with a diaphragm mounted in a housing. Another housing includes a force-measuring device such as a transducer. Pressure forces are transmitted from the diaphragm to the transducer by a central cylinder, and counter-acting tensile forces by a ring surrounding the cylinder and connected by sets of low-heat-conducting screws to both housings, the screws of the two sets being symmetrically spaced from each other around the ring. The cylinder and ring are formed of rigid thermally insulating material. The transducer is thus protected from the heat of the diesel engine.

BRIEF DESCRIPTION OF THE DRAWINGS

In the accompanying drawings.

DESCRIPTION OF THE PREFERRED EMBODIMENTS

Figure 1:
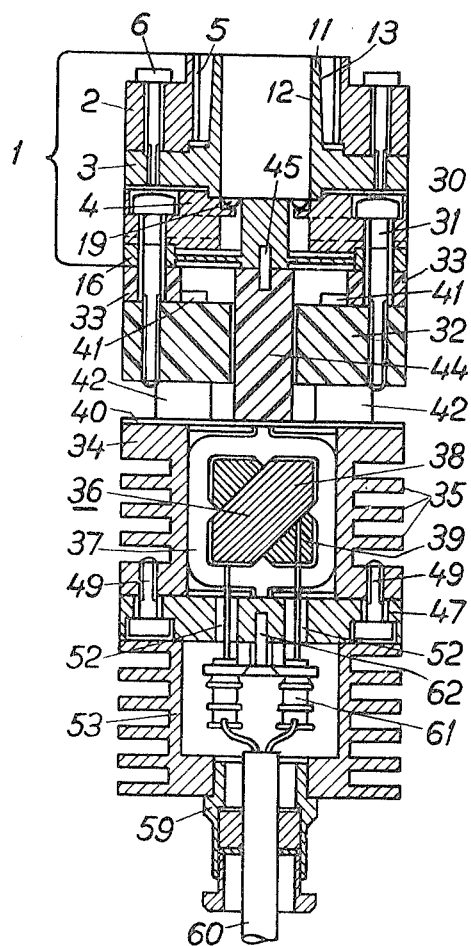
FIG. 1 shows a section through an indicator a according to the invention. assembling

FIG. 1 shows at the upper end of the indicator a membrane part 1 comprising a connection nut 2, a sealing cone 3 and a membrane housing 4. The connection nut has a thread 5 which fits the outer thread of an indicating tap arranged on the diesel engine. FIG. 3a shows a section through the nut 2 and cone 3, while FIG. 3b shows these two parts seen from above in FIG. 3a. The nut and cone are held together by four screws 6 which pass freely through the nut and are screwed into the annular flange 7 of the cone. A plurality of circular holes 8 are arranged along the periphery of the nut, as seen in FIG. 3b. With the help of these and the tool 9 shown in FIG. 2 the indicator can be assembled and dismantled. At one end of the tool is a cylindrical pin 10 which fits the holes 8 in the nut 2. The sealing cone has an upwardly directed tubular part 11 with an inner cylindrical surface 12 and an outer conical surface 13. The conical surface fits an inner conical surface on the indicating tap of the diesel engine. The thread 5 of the nut is constructed with large clearance in relation to the thread of the indicator tap so that the conical surface will be the sole guide when the indicator is screwed to the indicator tap of the diesel.

FIG. 3b shows four axially directed holes 14 which are drilled through the nut 2 and the flange 7 of the cone 3 near its periphery. These holes are for screws which pass freely through the holes and are screwed through unthreaded holes 15 in the diaphragm housing 4 into threaded holes in the circular control element 16 situated below the membrane housing. The nut 2, cone 3, diaphragm housing 4 and control element 16 will therefore be held together as a compact unit, forming the previously mentioned membrane part 1.

Figure 8A:
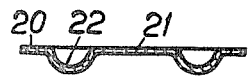
FIGS. 8a and 8b show in cross section and in top plan view, respectively, the force-sensing diaphragm on a larger scale than that used in the other figures.
Figure 8B:
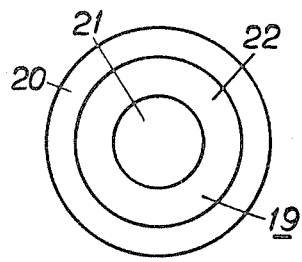

At its upper surface the diaphragm housing 4 has a relatively shallow circular recess 17 with a diameter somewhat greater than the diameter of a circular protuberance 18 on the sealing cone 3, which might be said to be a downward continuation of the upwardly directed tube 11. The depth of the recess 17 is slightly less than the length of the protuberance 18. In the recess 17 is a force-sensing diaphragm 19 which is shown on a larger scale in FIGS. 8a and 8b. Since the depth of the recess 17 is somewhat less than the length of the protuberance 18, the diaphragm will be firmly clamped between the protuberance and the bottom of the recess and at the same time a narrow annular gap is formed between the flange 7 of the sealing cone 3 and the diaphragm housing 4. The diaphragm is made of a thin, heat-resistant and corrosion-resistant material. As can be seen from the two figures just mentioned, the diaphragm 19 has an outer annular flange 20 and an inner circular flat surface 21, and a semitoroidal lowered part 22 between them. When the diaphragm 19 is in position and the diaphragm part screwed up the diaphragm seals completely against the gases coming from the diesel engine through the tube 11 and their force will thus act on the diaphragm. The diaphragm housing also has a substantial cylindrical space 23 with a diameter corresponding to the outer diameter of the lowered part 22 of the membrane.

The control element 16 comprises an outer ring 24 and a circular spring element 25 situated inside the ring and supporting at its center a force-transmitting member in the form of a column 26 with circular cross section. The diameter of the column corresponds to the diameter of the flat central surface 21 of the diaphragm 19 and the upper surface of the column is on a level with the bottom surface of the recess 17. When the diaphragm 19 is in position, therefore, its flat surface 21 will be contact with the upper surface of the be in 26 and the annular part 22 will extend downward in the annular space around the column as shown in FIG. 1. The pressure prevailing in the cylinder of the diesel engine will therefore act on the column.

An annular flange 27 projects from the diaphragm housing 4 and surrounds the column with a narrow space therebetween so that the space 23 is divided into an upper and a lower part connected to each other by the gap. From the lower part of the space 23 a number of radial channels 28 lead to the outer surface of the diaphragm housing. These channels can act as a safety valve if the membrane 19 should burst and the gas pressure in the engine thus be exerted on the annular spring element 25 which has a considerably greater area that the effective area of the diaphragm 19. The gap between the flange 27 and the column 26 will thus act as a throttle for the gasses flowing out.

In the membrane diaphragm and the ring 24 of the control element 16 are four holes 29, each having a countersunk part 30 at its upper end. Screws 31 pass freely through the holes. These screws are screwed into a rigid ring 32 of a heat-resistant material having low heat-conductivity and high modulus of elasticity. Between the ring 32 and membrane part 1 are spacers 33 around the screws 31. The spacer elements also consist of a material with low heat-conductivity. Both the ring 32 and the spacer elements 33 are made of some suitable mica-glass material. The screws 31 are of a material having low heat-conductivity, for example stainless steel of 18-8 type.

Figure 5A:
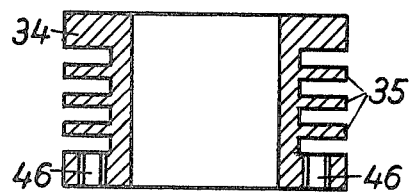
FIGS. 5a, 5b and 5c show in cross section; in bottom plan view and in top plan view, respectively, the measuring housing.

As shown in FIG. 5a, the measuring housing 34 consists of a cylindrical tube having external cooling flanges 35 and contains the force-sensing member or transducer 36. This is of some conventional type such as magneto-elastic, piezo-electric or of the type comprising strain-gauge transducers. The type shown in FIG. 1 has a core 37 of magnetostrictive material with an upper surface on a level with the upper surface of the housing 34 and a lower surface on a level with the lower surface of the housing. The core is provided in known manner with an excitation winding 38 which is connected to an alternating voltage source and a measuring winding 39 connected to a measuring device. The measuring housing is closed at the upper surface shown in FIGS. 1 and 5a by a weak plate 40 of a material having good heat-conductivity, for example, copper. The measuring housing is joined to the heat-insulating ring by means of four screws 41, only the heads of two screws being visible in FIG. 1. Screws 41 are spaced transversely of the body 32 with respect to screws 31. The screws pass freely through the ring 32 and through spacers 42 between the ring and the measuring housing. These spacer elements are suitably similar to the spacer elements 33. The screws are then screwed into holes 43 in the measuring housing, as is clear from FIG. 5c.

Between the lower surface of the column 26 and the plate 40 above the measuring housing is an element in the form of a column 44 of a material having a low heat-conductivity, which transmits the signal-carrying compressive force from the diaphragm to the transducer in the measuring housing. The columns 26 and 44 are held in alignment with the help of a pin 45 inserted in holes facing each other in the columns.

Figure 6A:
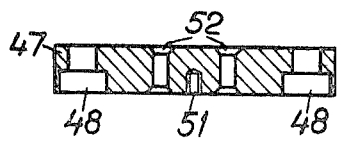
FIGS. 6a and 6b show in cross section and in bottom plan view, respectively, the plate which closes the measuring housing at the bottom.
Figure 6B:
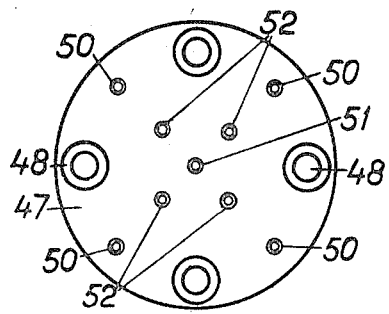
Figure 5B:
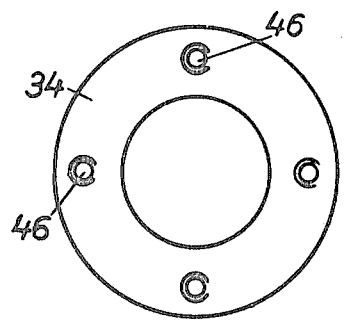
Figure 5C:
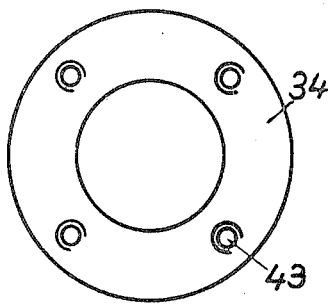

FIG. 5b shows the measuring housing seen from below in FIG. 5a. The measuring housing is provided with four threaded holes 46. A bottom plate 47 shows in FIGS. 6a and 6b is provided with four countersunk holes 48. Screws 49 are passed freely through the holes 48 in the bottom plate and screwed into the measuring housing. The measuring housing is thus closed at the bottom. FIG. 6b, showing the bottom plate seen from below, shows there are four more holes 50 in the bottom plate which are threaded and situated symmetrically between the holes 48. In the center of the bottom plate is a threaded hole 51. Symmetrically located around this hole are another four holes 52 through which the electric cables to the transducer pass.

Figure 7A:
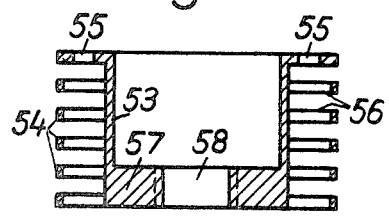
FIGS. 7a and 7b show in cross section and in top plan view, respectively, the housing containing the connecting elements for the transducer
Figure 7B:
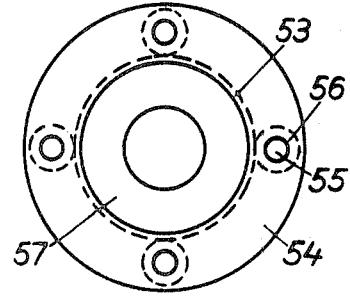

Below the bottom plate 47 is a housing 53 which contains connections for the electric cables to the transducer. The housing is shown in FIGS. 7a and 7b where 7a is a section in a plane forming an angle of 45° with the section plane in FIG. 1. The housing is provided with cooling flanges 54. The uppermost flange has four holes 55 drilled in it opposite the holes 50 in the bottom plate 47. By means of four screws, not shown, which pass freely through holes 55 and are screwed into the holes 50 in the bottom plate, the housing 53 is attached to the bottom plate. Opposite the holes 55, holes 56 are drilled in the flanges 54 so that said screws can be inserted from below. In the bottom part 57 of the housing 53 is a threaded hole 58 for a coupling 59 to a cable 60. The conductor of the cable is joined to the conductors from the transducers in a terminal block 61 which is attached to the bottom plate 47 by means of a screw 62 screwed into the threaded hole 51 in the center of the bottom plate.

Figure 2:
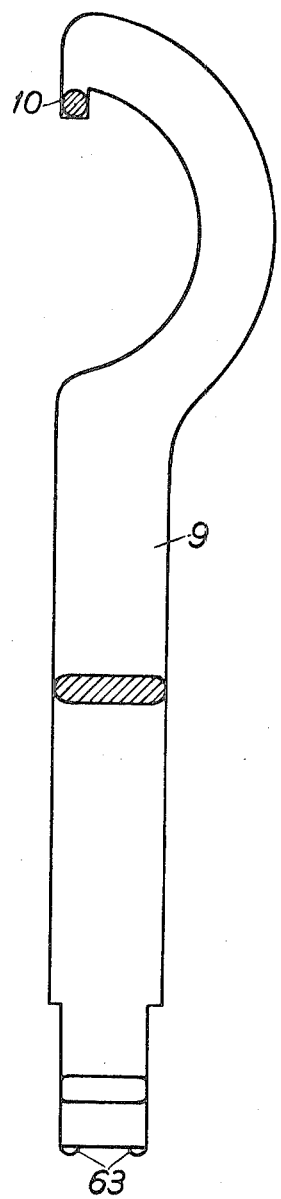
FIG. 2 shows a tool for assembling and dismantling the indicator and for cleaning the parts which become dirty during operation.
Figure 3A:
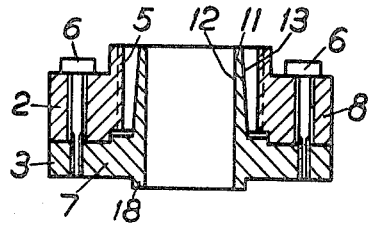
FIGS. 3a and 3b show in cross section and in top plan view respectively, components for attaching the indicator.
Figure 4A:
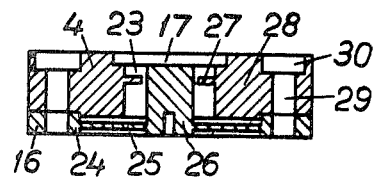
FIGS. 4a and 4b show in cross section and in top plan view, respectively, the part which carries the diaphragm.
Figure 3B:
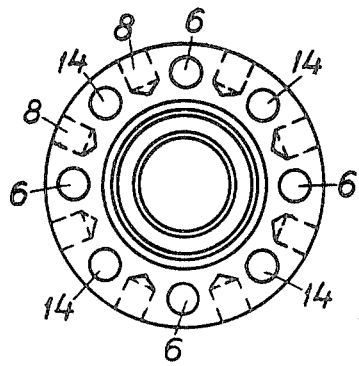
Figure 4B:
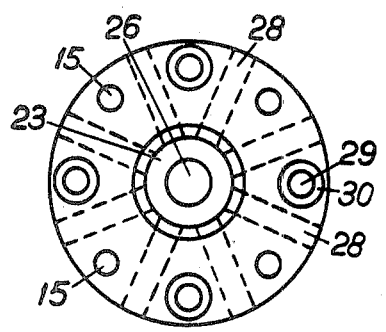

The tool 9 shown in FIG. 2 is narrower at its lower end. Here its width is slightly less than the inner diameter of the tubular part 11 of the sealing cone 3. Furthermore, the tool has two semicircular projections 63 corresponding to the cross section of the countersunk part 22 of the membrane 19. The lower part of the tool 9 may therefore be used to clean the inside of the tubular part 11 in the sealing cone.

I claim:

1. Indicator for continuous supervision of pressure processes in hot gases or liquids, for example the pressure variations in diesel engines, comprising a diaphragm part from which is obtained a compressive force depending on the pressure, a measuring housing containing a force-sensitive member which emits an electric signal dependent on the force, means for transmitting compressive force from the diaphragm part to the measuring housing and means for transmitting a counter-acting tensile force, each of said means including a thermally insulating rigid force-transmitting element, the means for transmitting tensile forces connecting the diaphragm part and measuring housing into a mechanical unit and transmitting such tensile forces with negligible elastic deformation, the tensile-force-transmitting connecting element comprising a body (32) of a heat-resistant and thermally insulating material having a high modulus of elasticity, spacers (33, 42) on each side of the body between the body and the diaphragm part and measuring housing, respectively, first and second attachment elements (31, 41) connecting said body to the diaphragm part and the measuring housing, respectively, the first attachment elements being spaced from the second attachment elements transversely of the body, whereby heat transmission between the diaphragm part and the measuring housing takes place only through the body (32) in a peripheral direction between adjacent attachment elements (31, 41).

2. Indicator according to claim 1, in which the thermally insulating and connecting element transmitting tensile force comprises a circular ring (32) which surrounds the centrally positioned element (44) transmitting compressive force.

3. Indicator according to claim 1, in which the thermally insulating and force-transmitting connection element (32), spacers (33, 42) and the stiff force-transmitting element (44) consist essentially of mica-glass material.

4. Indicator according to claim 1, in which said attachment elements comprise screws of a material having low heat-conductivity.

5. Indicator according to claim 1, in which the measuring housing (34) is closed at the end facing the diaphragm part (1) by a weak plate (40) of a material having good heat-conductivity.

6. Indicator according to claim 1, in which the measuring housing (34) is provided with out flanges (35).

7. Indicator according to claim 1, in which the measuring housing has a surface with a high absorption coefficient for low temperature radiation.

* * * * *